US012753631B2

(12) United States Patent
Kawamura et al.

(10) Patent No.: US 12,753,631 B2
(45) Date of Patent: Oct. 6, 2026

(54) VEHICLE DOOR HANDLE DEVICE

(71) Applicant: Minebea AccessSolutions Inc., Miyazaki (JP)

(72) Inventors: Seiji Kawamura, Miyazaki (JP); Tadashi Saito, Miyazaki (JP)

(73) Assignee: MINEBEA ACCESSSOLUTIONS INC., Miyazaki (JP)

( * ) Notice: Subject to any disclaimer, the term of this patent is extended or adjusted under 35 U.S.C. 154(b) by 43 days.

(21) Appl. No.: 18/612,133

(22) Filed: Mar. 21, 2024

(65) Prior Publication Data

US 2024/0318462 A1 Sep. 26, 2024

(30) Foreign Application Priority Data

Mar. 23, 2023 (JP) ................................ 2023-046233
Mar. 23, 2023 (JP) ................................ 2023-046234

(51) Int. Cl.

| | |
|---|---|
| ***E05B 85/06*** | (2014.01) |
| ***E05B 17/18*** | (2006.01) |
| ***E05B 85/10*** | (2014.01) |
| ***E05F 1/10*** | (2006.01) |

(52) U.S. Cl.

CPC ............ *E05B 17/183* (2013.01); *E05B 85/06* (2013.01); *E05B 85/10* (2013.01); *E05F 1/1041* (2013.01); *E05Y 2900/531* (2013.01)

(58) Field of Classification Search

CPC . E05B 81/90; E05B 5/00; E05B 85/06; E05B 85/10; E05B 85/103; E05B 85/107

See application file for complete search history.

(56) References Cited

U.S. PATENT DOCUMENTS 8,991,227 B2 * 3/2015 Muller .................. E05B 85/107 292/DIG. 31
9,708,831 B2 * 7/2017 Mathofer .............. E05B 17/183
(Continued)

FOREIGN PATENT DOCUMENTS

CN 206503456 U * 9/2017
DE 10 2014 112 887 A1 3/2016
(Continued)

OTHER PUBLICATIONS

Espacenet machine translation of CN 206503456 U, generated Jun. 28, 2025. (Year: 2025).*
(Continued)

*Primary Examiner* — Kristina R Fulton
*Assistant Examiner* — Emily G. Brown
(74) *Attorney, Agent, or Firm* — Chrisman Gallo Tochtrop LLC

(57) ABSTRACT

A vehicle door handle device includes a handle case including a hole, a cylinder lock unit disposed facing the hole and configured to switch a door lock device between a locked state and an unlocked state, a cover member pivotably supported by the handle case and configured to switch between a covered state of covering a keyhole of the cylinder lock unit and an exposed state of exposing the keyhole by pivoting at the hole, and a lever member configured to release a latch unit of the door lock device. The cover member includes an operation portion configured to rotate the cover member from the covered state to the exposed state and actuate the lever member.

8 Claims, 15 Drawing Sheets

(56) References Cited

U.S. PATENT DOCUMENTS

| | | | | |
|---|---|---|---|---|
| 2003/0019261 | A1 * | 1/2003 | Wittwer | E05B 85/107 292/336.3 |
| 2012/0137743 | A1 | 6/2012 | Katagiri et al. | |
| 2017/0159333 | A1 * | 6/2017 | Beck | E05B 79/06 |
| 2017/0260780 | A1 * | 9/2017 | Christensen | E05B 85/103 |
| 2019/0078360 | A1 * | 3/2019 | Blount | E05B 85/103 |
| 2021/0285264 | A1 * | 9/2021 | Couto Maquieira | E05B 81/90 |
| 2022/0243505 | A1 * | 8/2022 | Moriyama | E05B 81/36 |

FOREIGN PATENT DOCUMENTS

| | | | | |
|---|---|---|---|---|
| DE | 102019103568 | B3 * | 3/2020 | E05B 81/90 |
| EP | 3 179 020 | A1 | 6/2017 | |
| JP | H11241532 | A | 9/1999 | |
| JP | 2007314956 | A | 12/2007 | |
| JP | 2007321470 | A | 12/2007 | |
| JP | 2016-199937 | A | 12/2016 | |

OTHER PUBLICATIONS

Espacenet, machine translation of CN 206503456 U, generated Jun. 29, 2025. (Year: 2025).*

Extended European Search Report dated Jul. 22, 2024 for corresponding European Application No. 24162140.8.

* cited by examiner

VEHICLE DOOR HANDLE DEVICE

CROSS REFERENCE TO RELATED APPLICATION

This application claims benefits of priority to Japanese Patent Application No. 2020-046233 filed on Mar. 23, 2023, and Japanese Patent Application No. 2020-046234 filed on Mar. 23, 2023, the entire content of which is incorporated herein by reference.

BACKGROUND

Technical Field

The present invention relates to a handle device provided on a door of a vehicle.

Background Art

US 2021/0285264 A1 describes a vehicle door handle device including a cover member (flap) that covers a keyhole of a cylinder lock. In such a vehicle door handle device, the flap is pivotally supported by a housing. Pressing one end portion of the flap rotates the flap, exposing the keyhole and enabling insertion of a key.

In the vehicle door handle device described in US 2021/0285264 A1, to open the door, it is necessary to insert the key into the cylinder lock and rotate the key with the flap pressed open to unlock the door, and then pull a handle, which is separate from the flap, to actuate a lever member and release a latch. Thus, this configuration has a large number of components, and is difficult to operate. Further, the flap is biased in an initial position direction by a spring and the handle needs to be operated while pressing the flap with a finger to keep the flap from returning to the initial position, resulting in poor operability. Since a spring for biasing the flap in the initial position direction and a spring for biasing the lever member in the initial position direction are required, the vehicle door handle device has a large number of components.

SUMMARY

An object of the present invention is to provide a vehicle door handle device that has improved operability and a reduced number of components.

An aspect of the present invention provides a vehicle door handle device including a handle case including a hole, a cylinder lock unit disposed facing the hole and configured to switch a door lock device between a locked state and an unlocked state, a cover member pivotably supported by the handle case and configured to switch between a covered state of covering a keyhole of the cylinder lock unit and an exposed state of exposing the keyhole by pivoting at the hole, and a lever member configured to release a latch unit of the door lock device. The cover member includes an operation portion configured to rotate the cover member from the covered state to the exposed state and actuate the lever member.

An aspect of the present invention provides a vehicle door handle device including a handle case including a hole, a cylinder lock unit disposed facing the hole and configured to switch a door lock device between a locked state and an unlocked state, a cover member pivotably supported by the handle case and configured to switch between a covered state of covering a keyhole of the cylinder lock unit and an exposed state of exposing the keyhole by pivoting at the hole, a lever member configured to release a latch unit of the door lock device, and a biasing member configured to bias the lever member to an initial position. The cover member includes an actuating portion configured to actuate the lever member by rotating from the covered state to the exposed state, and, when the lever member actuated is returned to the initial position, the biasing member rotates the cover member from the exposed state to the covered state via the actuating portion.

According to the present invention, in a vehicle door handle device, it is possible to improve operability while suppressing a number of components.

DETAILED DESCRIPTION

Next, an embodiment of the present invention will be described in detail with reference to the drawings as appropriate, taking a case in which a vehicle door handle device of the present invention is applied to a side door for a front seat on a left side of a vehicle (driver's seat in a left-hand drive vehicle) as an example. Note that, in the referenced drawings, "front-rear" indicates a front-rear direction in a traveling direction of the vehicle, that is, a vehicle body front-rear direction, and "left-right" indicates a left-right direction (vehicle width direction) as viewed from the driver's seat. Such directional expressions are based on a state in which the side door is closed.

Figure 1:
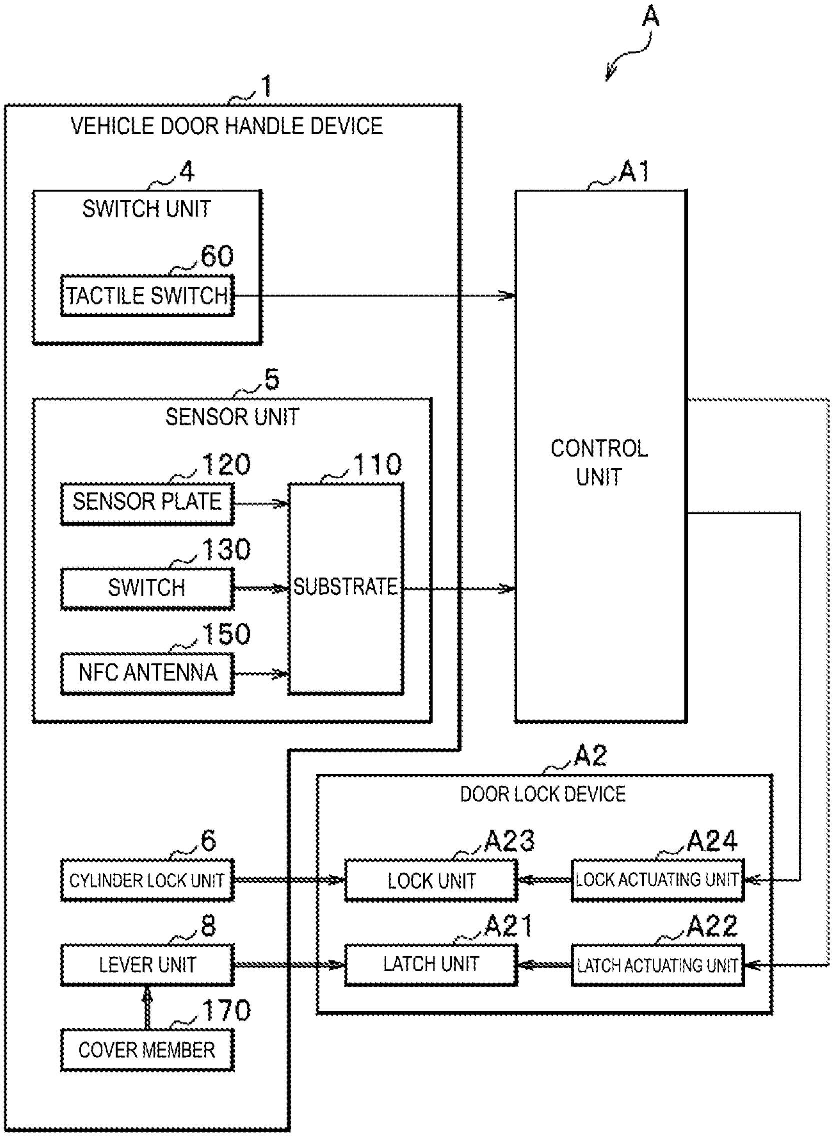
FIG. 1 is a block diagram schematically illustrating a vehicle door system including a vehicle door handle device according to an embodiment of the present invention.

As illustrated in FIG. 1, a door system A according to an embodiment of the present invention is a system for switching a side door 2 between a locked state and an unlocked state, and switching the side door 2 in the unlocked state between a latched state and an unlatched state, in a state in which the side door 2 (refer to FIG. 3) is closed. The side door 2 is a door that can open/close an opening formed in a vehicle body side surface using a front end portion of the side door 2 as a pivot axis (hinge). The door system A includes a control unit A1, a door lock device A2, and a vehicle door handle device 1.

The control unit A1 is a so-called electrical control unit (ECU) constituted by a central processing unit (CPU), a read-only memory (ROM), a random access memory (RAM), an input/output circuit, and the like. The control unit A1 acquires a control signal output from the vehicle door handle device 1 and controls the door lock device A2 on the basis of the control signal acquired.

The door lock device A2 includes a latch unit A21, a latch actuating unit A22, a lock unit A23, and a lock actuating unit A24.

The latch unit A21 is a latch mechanism configured to be switchable between a latched state in which the side door 2 in a closed state and the vehicle body are engaged with each other, and an unlatched state in which the engagement between the side door 2 in the closed state and the vehicle body is released.

The latch actuating unit A22 is constituted by a motor or the like, and switches the state of the latch unit A1 between the latched state and the unlatched state on the basis of control by the control unit A21.

The lock unit A23 is a lock mechanism that, when the side door 2 is closed and the latch unit A21 is in the latched state, is configured to be switchable between a locked state in which the latched state cannot be switched to the unlatched state and an unlocked state in which the latched state can be switched to the unlatched state.

The lock actuating unit A24 is constituted by a motor or the like, and switches the state of the lock unit A23 between the locked state and the unlocked state on the basis of the control by the control unit A1.

Figure 2:
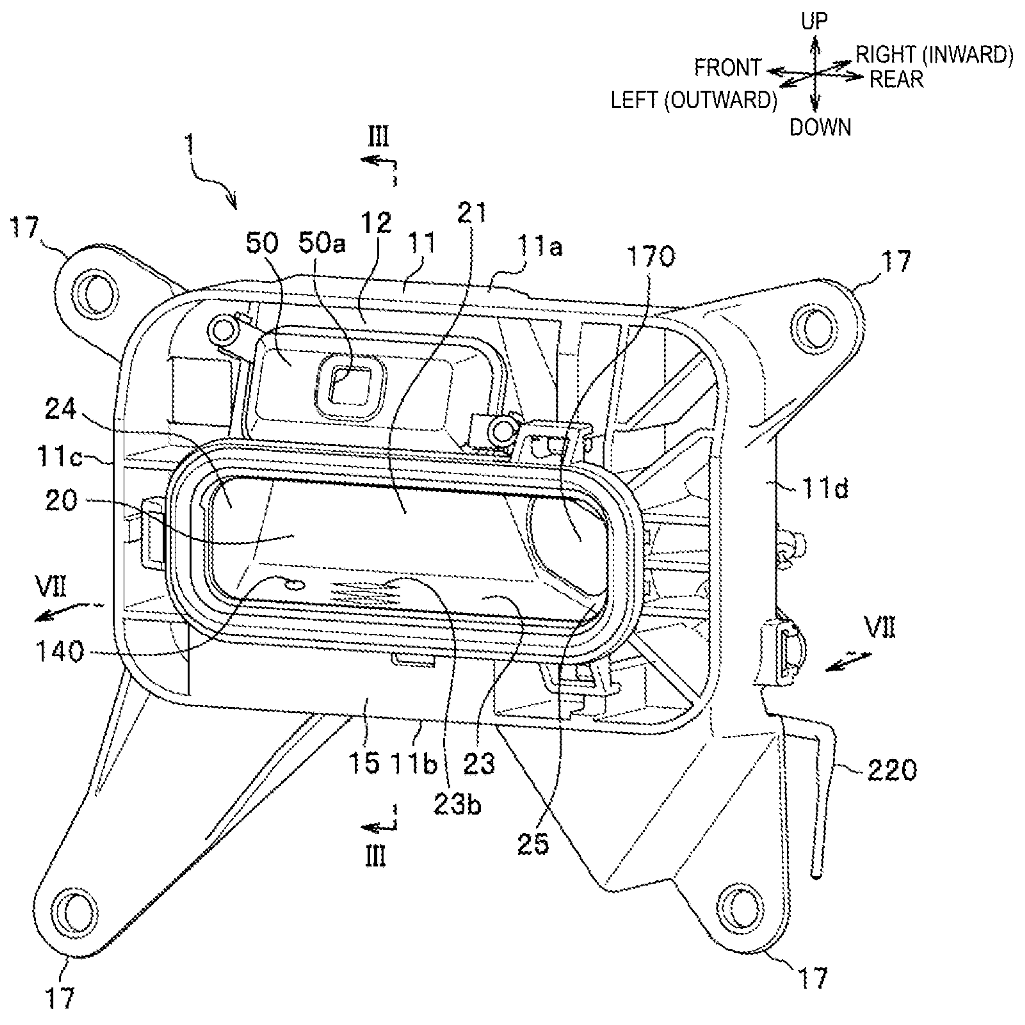
FIG. 2 is a perspective view schematically illustrating the vehicle door handle device according to an embodiment of the present invention.
Figure 3:
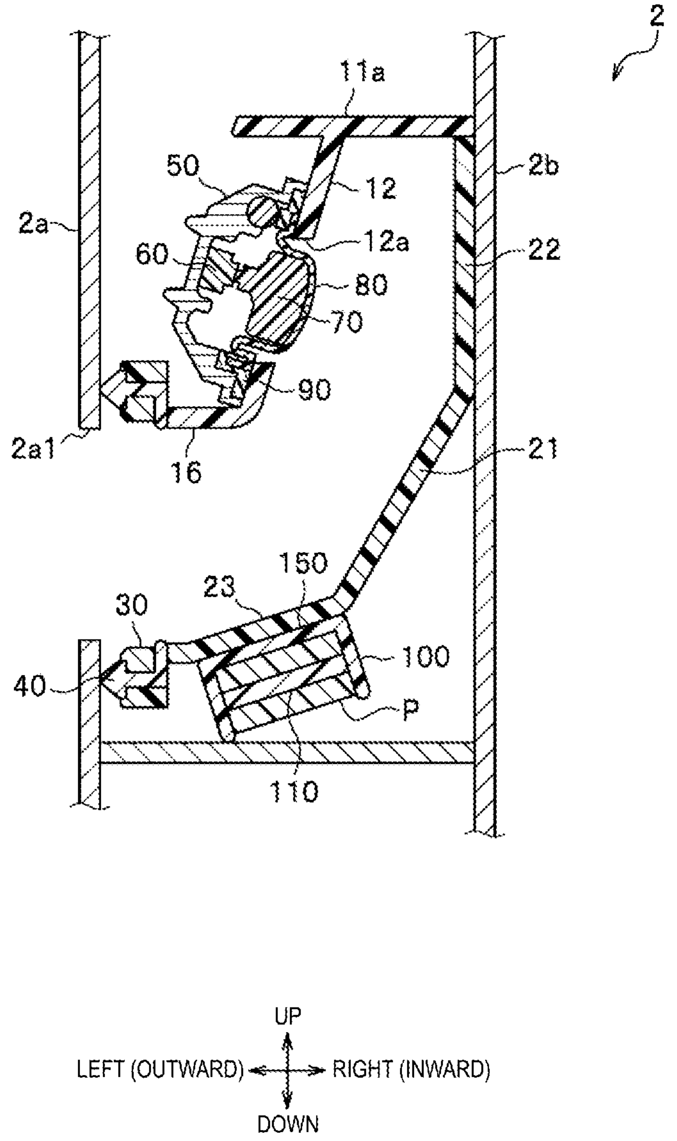
FIG. 3 is a cross-sectional view schematically illustrating a side door provided with the vehicle door handle device, taken along line III-III of FIG. 2.
Figure 4:
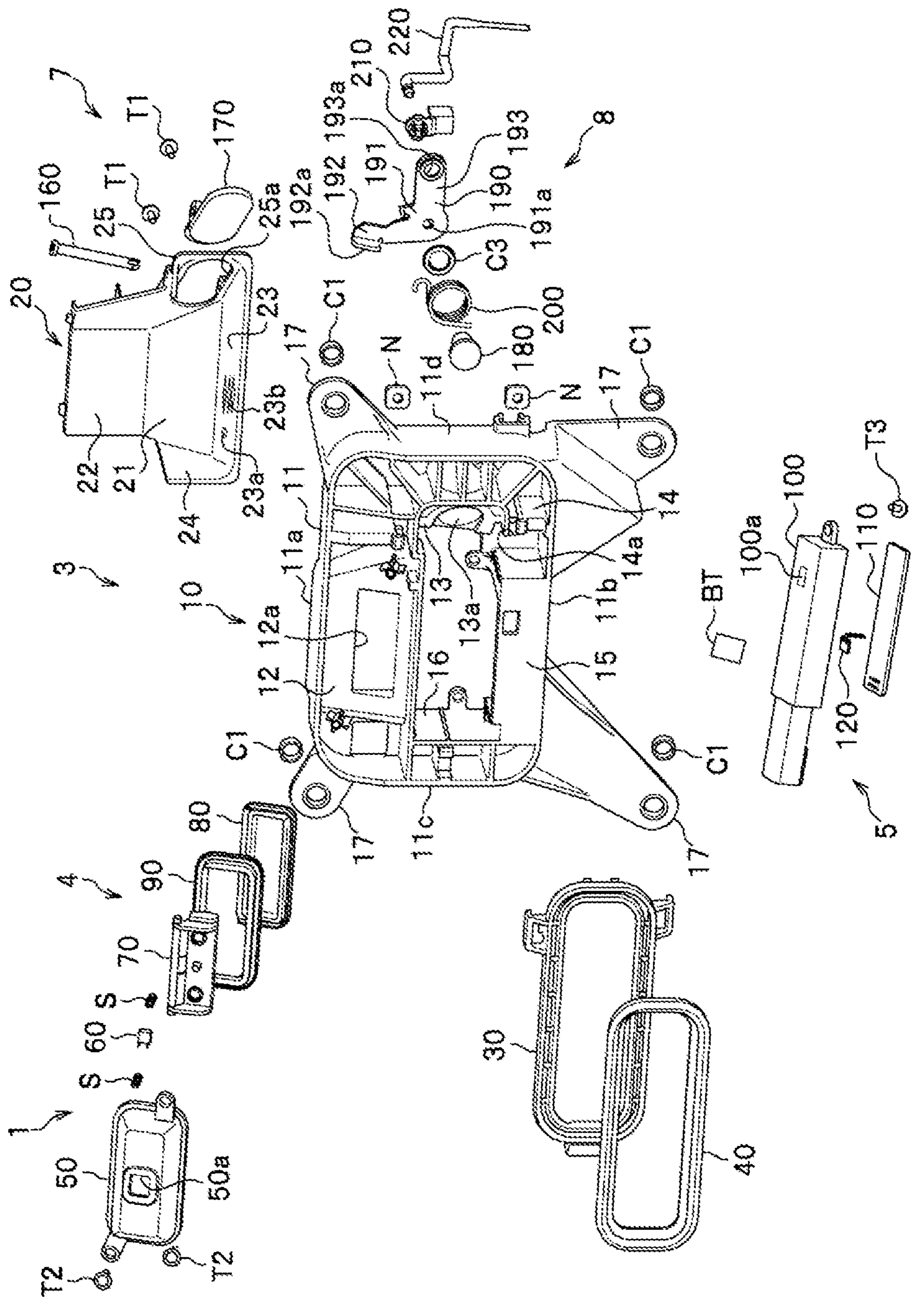
FIG. 4 is an exploded perspective view schematically illustrating the vehicle door handle device according to an embodiment of the present invention.
Figure 10:
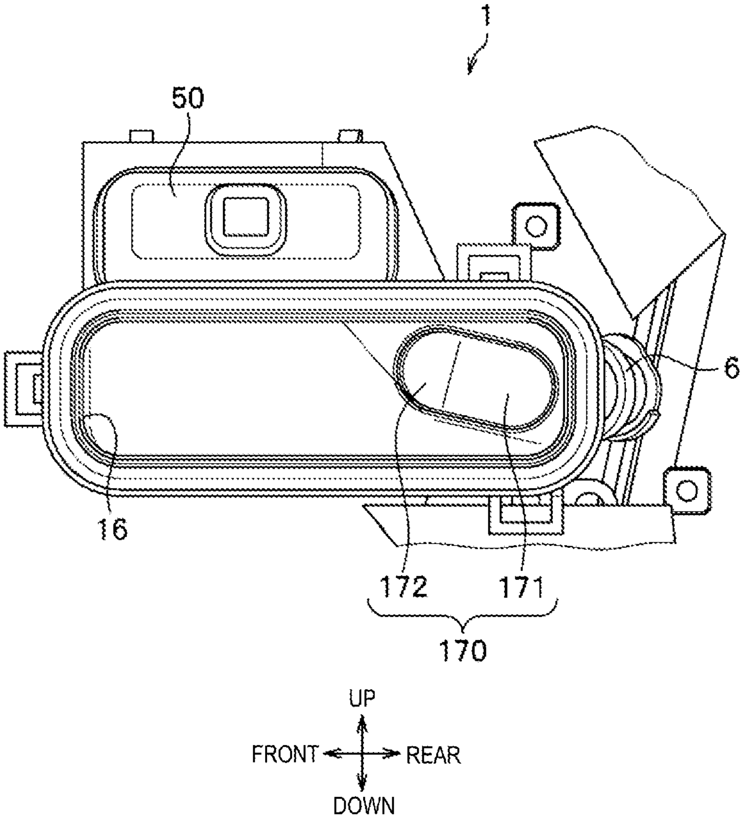
FIG. 10 is a view of the vehicle door handle device according to an embodiment of the present invention as viewed from a position outward in the vehicle width direction, and is a schematic view (enlarged view of a main portion) illustrating a state in which the cover member is closed.

As illustrated in FIGS. 2 and 3, the vehicle door handle device 1 according to an embodiment of the present invention is provided between an outer panel 2*a* and an inner panel 2*b* that constitute the side door 2. As illustrated in FIG. 4, the vehicle door handle device 1 includes a handle case 3, a switch unit 4, a sensor unit 5, a cylinder lock unit 6 (refer to FIG. 10), a cover unit 7, and a lever unit 8.

The handle case 3 is an area to be held by a user outside the vehicle when opening and closing the side door 2. The handle case 3 includes a base member 10, a case member 20, a gasket 30, and a molding 40.

The base member 10 is a resin member constituting a main portion of the handle case 3. The base member 10 integrally includes a frame portion 11 having a rectangular frame shape, a switch attachment portion 12, a cylinder lock attachment portion 13, a lever attachment portion 14, a sensor installation portion 15, and an opening 16 formed inside the frame portion 11, and a plurality of (four in the present embodiment) flange portions 17 formed outside the frame portion 11.

The frame portion 11 integrally includes an upper side portion 11*a* and a lower side portion 11*b* vertically separated from each other and extending in the front-rear direction, a front side portion 11*c* that connects front end portions of the upper side portion 11*a* and the lower side portion 11*b*, and a rear side portion 11*d* that connects rear end portions of the upper side portion 11*a* and the lower side portion 11*b*.

The switch attachment portion 12 is an area to which the switch unit 4 is attached. The switch attachment portion 12 extends downward from an intermediate portion of the upper side portion 11*a* of the frame portion 11 in the vehicle width direction. The switch attachment portion 12 is inclined downwardly outward in the vehicle width direction. An opening 12*a* having a rectangular shape is formed in the switch attachment portion 12.

The cylinder lock attachment portion 13 is an area to which the cylinder lock unit 6 is attached. The cylinder lock attachment portion 13 extends frontward from an inner end portion of the rear side portion 11*d* of the frame portion 11 in the vehicle width direction. In the cylinder lock attachment portion 13, a tubular portion 13*a* is formed projecting inward in the vehicle width direction. The tubular portion 13*a* is inclined frontwardly outward in the vehicle width direction.

The lever attachment portion 14 is an area to which the lever unit 8 is attached. The lever attachment portion 14 extends upward from an inner end portion of the lower side portion 11*b* (rear portion) of the frame portion 11 in the vehicle width direction. In the lever attachment portion 14, a tubular portion 14*a* is formed protruding inward in the vehicle width direction.

The sensor installation portion 15 is an area that covers the sensor unit 5 from an area outward in the vehicle width direction. The sensor installation portion 15 extends upward from an outer end portion of the lower side portion 11*b* (front portion) of the frame portion 11 in the vehicle width direction.

The opening 16 is an area having a rectangular frame shape surrounded by the switch attachment portion 12 on an upper side, the cylinder lock attachment portion 13 on a rear side, the lever attachment portion 14 on a rear lower side, and the sensor installation portion 15 on a lower side. The user can open and close the side door 2 by inserting his/her hand into the opening 16 and gripping an upper edge portion side of the opening 16.

The flange portions 17 extend outward from inner end portions, in the vehicle width direction, of four corner portions of the frame portion 11. The flange portion 17 is attached to the inner panel 2*b* of the side door 2 with a collar Cl and bolts (not illustrated).

Figure 5:
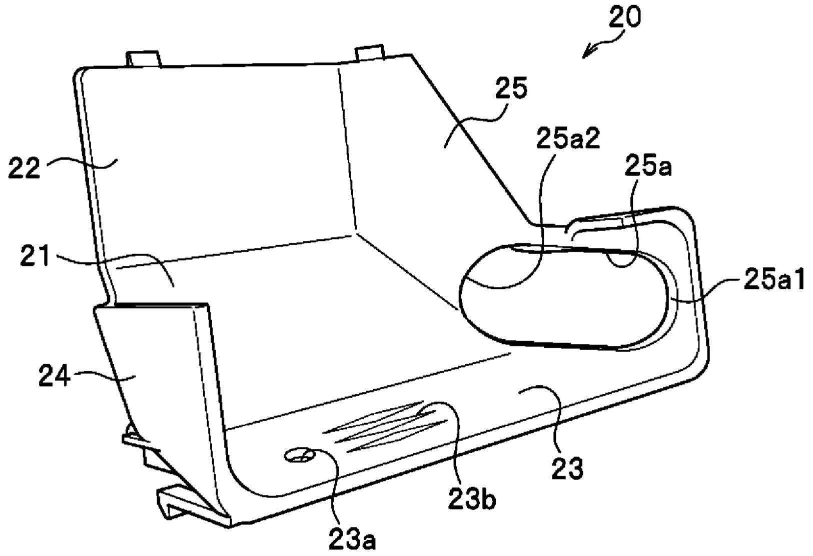
FIG. 5 is a perspective view of a case member as viewed from a position outward in a vehicle width direction.
Figure 6:
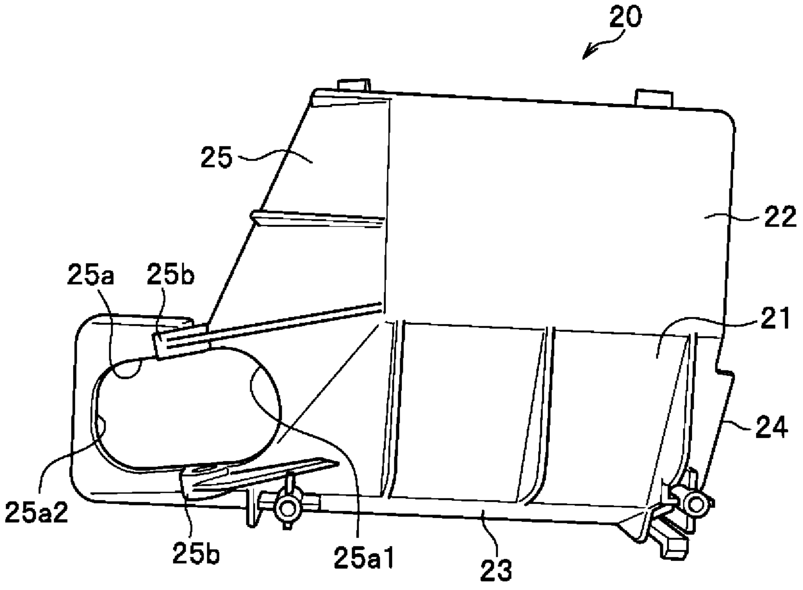
FIG. 6 is a perspective view of the case member as viewed from a position inward in the vehicle width direction.

The case member 20 is a resin member that works with the base member 10 to form a closed space (housing) on an inner side of the opening 16 in the vehicle width direction. The case member 20 is attached to the base member 10 with a tapping screw T1. As illustrated in FIGS. 5 and 6, the case member 20 integrally includes an inclined wall portion 21, an inner wall portion 22 extending upward from an upper end portion of the inclined wall portion 21, and a lower wall portion 23 extending outward in the vehicle width direction from a lower end portion of the inclined wall portion 21. Further, the case member 20 integrally includes a front wall portion 24 extending outward in the vehicle width direction from a front end portion of the inclined wall portion 21, and a rear wall portion 25 extending outward in the vehicle width direction from rear end portions of the inclined wall portion 21 and the inner wall portion 22.

The inclined wall portion 21 is an area facing the opening 16 as viewed from a position outward in the vehicle width direction, and is inclined upwardly inward in the vehicle width direction.

The inner wall portion 22 is an area facing the switch attachment portion 12 as viewed from a position outward in the vehicle width direction.

The lower wall portion 23 is inclined downwardly outward in the vehicle width direction. A front end portion of the lower wall portion 23 is connected to a lower end portion of the front wall portion 24, and a rear end portion of the lower wall portion 23 is connected to a lower end portion of the rear wall portion 25. The front end portion of the lower wall portion 23 abuts against an upper end portion of the sensor installation portion 15. A hole 23*a* and a mark 23*b* are formed in the lower wall portion 23.

The rear wall portion 25 is inclined rearwardly outward in the vehicle width direction. A hole 25*a* is formed in the rear wall portion 25 at a position overlapping the cylinder lock attachment portion 13 (refer to FIG. 4) as viewed from a position outward in the vehicle width direction. On an inner side surface of the rear wall portion 25 in the vehicle width direction, a pin attachment portion 25*b* is formed slightly frontward of an intermediate portion of upper and lower edge portions of the hole 25*a* in the front-rear direction. The pin attachment portion 25*b* is a tubular portion through which a pin 160 described below is inserted.

As illustrated in FIG. 4, the gasket 30 is a resin member having a rectangular frame shape that covers an outer edge portion of the opening 16 in the vehicle width direction. The gasket 30 is attached to the base member 10 by engaging a claw portion formed on the gasket 30 with a hole formed in the base member 10, or by engaging a claw portion formed on the base member 10 with a hole in a flange portion formed on the gasket 30.

The molding 40 is a resin member having a rectangular frame shape that is attached to the gasket 30, protruding outward in the vehicle width direction from the gasket 30. The molding 40 is softer (more elastic) than the gasket 30 and abuts against the outer panel 2*a* (refer to FIG. 3) of the side door 2.

The switch unit 4 is a switch for electrically actuating the latch actuating unit A22 (refer to FIG. 1) of the door lock device A2 by a user operation. The switch unit 4 includes a case 50, a tactile switch 60, a slider 70, a button 80, and a seal 90.

The case 50 is a resin member having a box shape and is attached to an outer side of the switch attachment portion 12 in the vehicle width direction, covering the opening 12*a*. The case 50 is attached to the switch attachment portion 12 with a tapping screw T2. A hole 50*a* is formed in the case 50.

The tactile switch 60 is accommodated in the case 50 and is electrically connected to the control unit A1 (refer to FIG. 1) via an external wiring line (not illustrated) extending through the hole 50*a* of the case 50.

The slider 70 is a resin member accommodated in the case 50 slidably in the vehicle width direction. A biasing member (spring) S is interposed between the slider 70 and the case 50.

The button 80 is a resin member attached in the opening 12*a*, covering an inner side of the case 50 in the vehicle width direction.

The seal 90 is provided interposed between the case 50 and the button 80, and is a resin member that closes a gap between the case 50 and the switch attachment portion 12.

Figure 7:
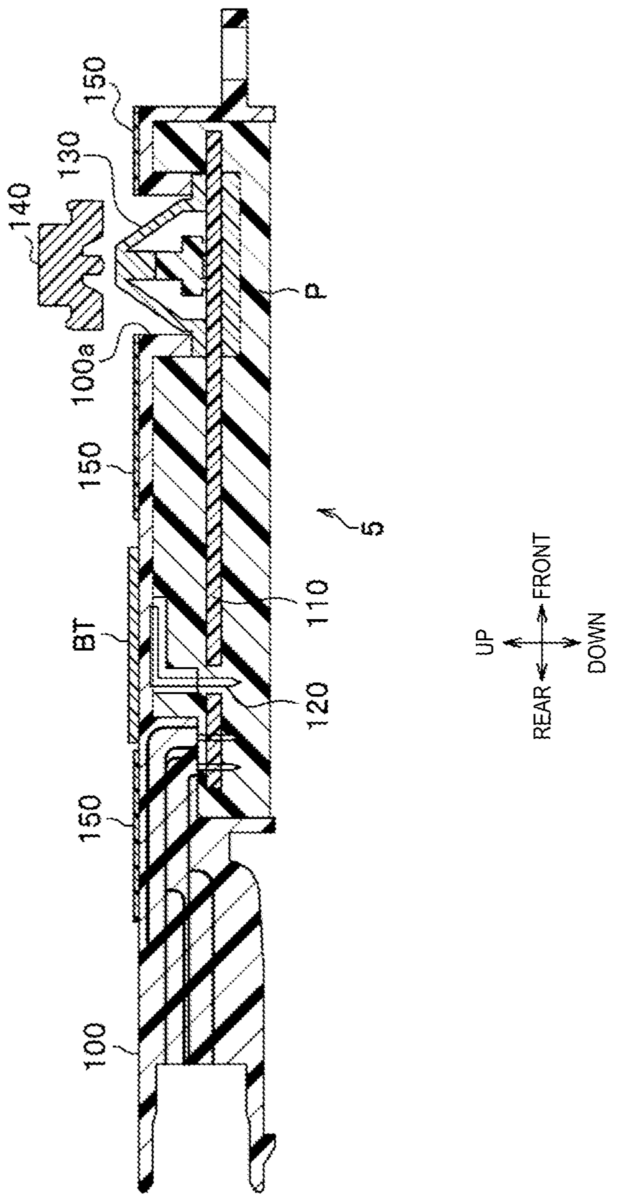
FIG. 7 is a cross-sectional view taken along line VII-VII of FIG. 2.

The sensor unit 5 is a sensor for electrically actuating the latch actuating unit A22 and the lock actuating unit A24 (refer to FIG. 1) of the door lock device A2 by a user operation. As illustrated in FIGS. 4 and 7, the sensor unit 5 includes a case 100, a substrate (control unit) 110, a sensor plate 120, a switch 130, a button 140, and a near field communication (NFC) antenna 150.

The case 100 is a resin member having a housing shape with an opening at a lower portion of the case 100. A hole 100*a* is formed in an upper wall portion of the case 100. The case 100 is attached to a lower surface side of the lower wall portion 23 of the case member 20 with a tapping screw T3.

The substrate 110 is accommodated in the case 100. Various components are mounted on the substrate 110, and the substrate 110 is communicably connected to the control unit A1 (refer to FIG. 1) via a wiring line disposed in the case 100.

The sensor plate 120 is an electrostatic capacitance sensor accommodated in the case 100 in a state of being electrically connected to the substrate 110. A butyl tape BT is applied to an area of the upper wall portion of the case 100 above the sensor plate 120.

The substrate 110 and the sensor plate 120 are fixed to the case 100 by a potting P with which the case 100 is filled.

The switch 130 is accommodated in the case 100 in a state of being attached on the substrate 110. An endmost portion of the switch 130 protrudes upward from the hole 100*a* of the case 100.

The button 140 is disposed in the hole 23*a* of the lower wall portion 23 of the case member 20.

The NFC antenna 150 is disposed on the upper wall portion of the case 100 and is communicably connected to the substrate 110.

As illustrated in FIG. 1, the cylinder lock unit 6 actuates the lock unit A23 by a user operation with a key. A keyhole 6*a* into which the key can be inserted is formed at an endmost portion (outer end portion in the vehicle width direction) of the cylinder lock unit 6. The cylinder lock unit 6 is disposed facing the hole 25*a*, that is, at a position closer to a vehicle interior than the hole 25*a* and overlapping (at least the keyhole 6*a* overlapping) the hole 25*a* as viewed from a direction orthogonal to the side door 2, and is attached to the base member 10 with a nut N and a bolt (not illustrated) in a state of being accommodated in the tubular portion 13*a* of the cylinder lock attachment portion 13 (refer to FIG. 4).

As illustrated in FIG. 4, the cover unit 7 is configured to be switchable between a state of covering the cylinder lock unit 6 from a position outward in the vehicle width direction by closing the opening 16 and a state of enabling access to the cylinder lock unit 6 from a position outward in the vehicle width direction by opening the opening 16. The cover unit 7 includes the pin 160 and a cover member 170.

The pin 160 is a resin member having a rod shape and serving as a pivot (forward/reverse rotation) axis of the cover member 170.

Figure 8:
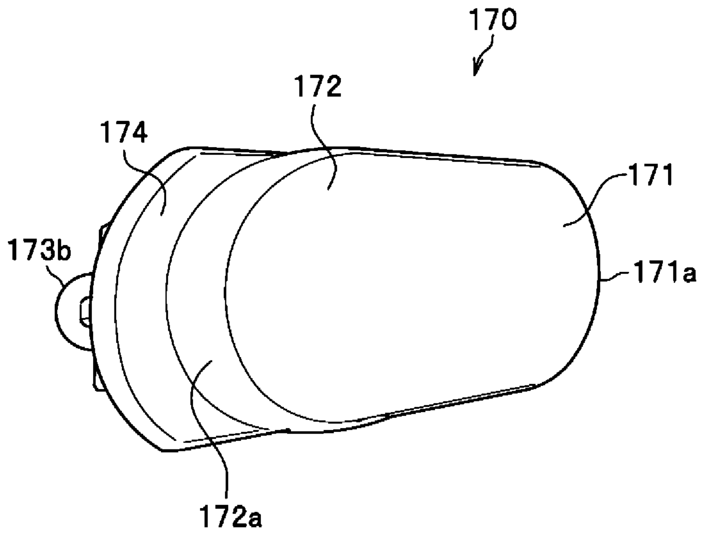
FIG. 8 is a perspective view of a cover member as viewed from a position outward in the vehicle width direction.
Figure 9:
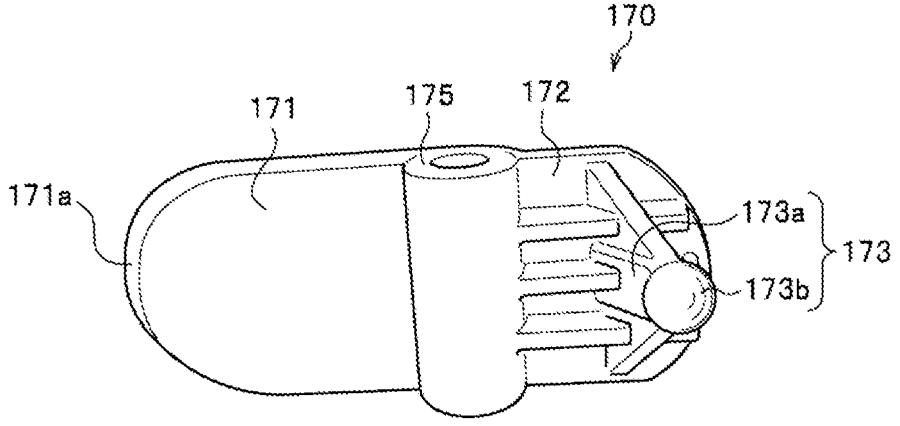
FIG. 9 is a perspective view of the cover member as viewed from a position inward in the vehicle width direction.

The cover member 170 is a resin member having a flat plate shape that covers the cylinder lock unit 6 from a position outward in the vehicle width direction by closing the opening 16. As illustrated in FIGS. 8 and 9, the cover member 170 integrally includes a cover portion 171 and an operation portion 172 having shapes matching that of the hole 25*a*, an actuating portion 173, a flange portion 174, and a pin attachment portion 175.

The cover portion 171 is disposed at a position of the hole 25*a* that overlaps the cylinder lock attachment portion 13 as viewed from a position outward in the vehicle width direction.

The operation portion 172 extends frontward from a front end portion of the cover portion 171, and is disposed at a position of the hole 25*a* that overlaps the opening 16 as viewed from a position outward in the vehicle width direction.

The actuating portion 173 is a portion that actuates a lever member 190 described below by rotation of the cover member 170. The actuating portion 173 integrally includes a shaft portion 173*a* extending inward in the vehicle width direction from an inner surface of the operation portion 172 in the vehicle width direction, and an engagement portion 173*b* formed at an endmost portion of the shaft portion 173*a*. The engagement portion 173*b* has a spherical shape (spherical crown shape).

The flange portion 174 extends frontward from an inner end portion, in the vehicle width direction, of a front end portion of the operation portion 172.

The pin attachment portion 175 is formed at a boundary portion (inner side in the vehicle width direction) between the cover portion 171 and the operation portion 172, and is a tubular portion through which the pin 160 is inserted.

As illustrated in FIG. 4, the lever unit 8 is a part that actuates the latch unit A21 (refer to FIG. 1) by rotation of the cover member 170. The lever unit 8 includes a shaft 180, the lever member 190, a biasing member 200, a bushing 210, and a rod 220.

The shaft 180 is a metal member having a shaft shape and serving as a pivot axis of the lever member 190. The shaft 180 is accommodated in the cylinder portion 14*a* of the lever attachment portion 14.

The lever member 190 is a metal member for switching the latch unit A21 (refer to FIG. 1) of the door lock device A2 from the latched state to the unlatched state. The lever member 190 has an overall substantial L-shape, and integrally includes a base portion 191, and a first piece portion 192 and a second piece portion 193 extending in a radial direction from the base portion 191.

The base portion 191 is a portion serving as a pivot center of the lever member 190. A hole 191*a* is formed in the base portion 191. A pin for attaching the base portion 191 to the shaft 180 is inserted into the hole 191*a*.

An engagement portion (flange portion) 192*a* that engages with (abuts against) the actuating portion 173 of the cover member 170 is formed at an endmost portion of the first piece portion 192.

The second piece portion 193 is provided at a position offset from the first piece portion 192 in a circumferential direction (at a phase different from that of the first piece portion 192). A hole 193*a* is formed at an endmost portion of the second piece portion 193.

The biasing member 200 is a spring that biases the lever member 190 in a direction of an initial position (a position at which the engagement portion 192*a* abuts against the actuating portion 173 of the cover member 170 in the closed state). The biasing member 200 is externally fitted to the shaft 180, and a collar C3 is interposed between the biasing member 200 and the base portion 191 of the lever member 190.

The bushing 210 is a resin member that engages with a hole 193*a* of the second piece portion 193.

The rod 220 is a metal member that has a rod shape for transmitting the pivoting of the lever member 190 to the latch unit A21 of the door lock device A2. One end portion of the rod 220 is attached to the hole 193*a* of the second piece portion 193 with the bushing 210 interposed therebetween. The other end portion of the rod 220 is engaged with the latch unit A21 via a link mechanism (not illustrated) or the like.

Next, an operation example of the door system A including the vehicle door handle device 1 will be described mainly with reference to FIG. 1 (and to other drawings as appropriate).

When a user carrying a smart key (frequency operated button (FOB)) approaches the vehicle, the control unit A1 detects the smart key by communication with the smart key and, on the basis of a detection result, actuates the lock actuating unit A24 of the door lock device A2, switching the lock unit A23 from the locked state to the unlocked state. Subsequently, when the user inserts his/her hand into the opening 12*a* and presses the button 80 outward in the vehicle width direction with his/her finger, the slider 70 slides outward in the vehicle width direction against the biasing force of the biasing member S and abuts against the tactile switch 60. In such a state, the tactile switch 60 outputs an electric signal to the control unit A1 via the wiring line. On the basis of the electric signal, the control unit A1 actuates the latch actuating unit A22 of the door lock device A2, switching the latch unit A21 from the latched state to the unlatched state. In such a state, the user can manually open the side door 2 by gripping the peripheral edge portion of the opening 12*a* of the vehicle door handle device 1.

When the user puts his/her hand into the opening 16 and presses the button 140 with his/her finger to press the switch 130 via the button 140, the substrate 110 outputs an electric signal to the control unit A1 in accordance with an operation result of the button 140 (that is, a result of pressing the switch 130). On the basis of the electric signal, the control unit A1 actuates the lock actuating unit A24 and the latch actuating unit A22 of the door lock device A2, switching the lock unit A23 from the locked state to the unlocked state and switching the latch unit A21 from the latched state to the unlatched state. Subsequently, the control unit A1 controls a door actuating unit (not illustrated) and the side door 2 automatically opens.

When the user inserts a terminal device (such as a smartphone) into the opening 16 and holds the terminal device over the NFC antenna 150, the substrate 110 outputs an electric signal to the control unit A1 (refer to FIG. 1) in response to a control signal transmitted via the NFC antenna 150. The control unit A1 actuates the lock actuating unit A24 of the door lock device A2 on the basis of the electric signal, switching the lock unit A23 from the locked state to the unlocked state. Note that, even when the terminal device is powered off, the NFC antenna 150 supplies power to the terminal device, which makes it possible for the terminal device to transmit a control signal to the NFC antenna 150.

Subsequently, when the user inserts his/her hand into the opening 12*a* and presses the button 80 outward in the vehicle width direction with his/her finger, the slider 70 slides outward in the vehicle width direction against the biasing force of the biasing member S and abuts against the tactile switch 60. In such a state, the tactile switch 60 outputs an electric signal to the control unit A1 via the wiring line. On the basis of the electric signal, the control unit A1 actuates the latch actuating unit A22 of the door lock device A2, switching the latch unit A21 from the latched state to the unlatched state. In such a state, the user can manually open the side door 2 by gripping the peripheral edge portion of the opening 12*a* of the vehicle door handle device 1.

When the user inserts his/her hand into the opening 16 and touches the mark 23*b* of the lower wall portion 23 of the case member 20 with his/her finger, the substrate 110 outputs an electric signal to the control unit A1 in accordance with a detection result (change in electrostatic capacitance) of the sensor plate 120. The control unit A1 actuates the lock actuating unit A24 of the door lock device A2 on the basis of the electric signal, switching the lock unit A23 from the unlocked state to the locked state. For example, the control unit A1 may switch the lock unit A23 to the locked state and maintain the locked state for a predetermined period of time after the detection result of the sensor plate 120 is obtained, even when the detection result of the smart key is obtained.

Figure 11:
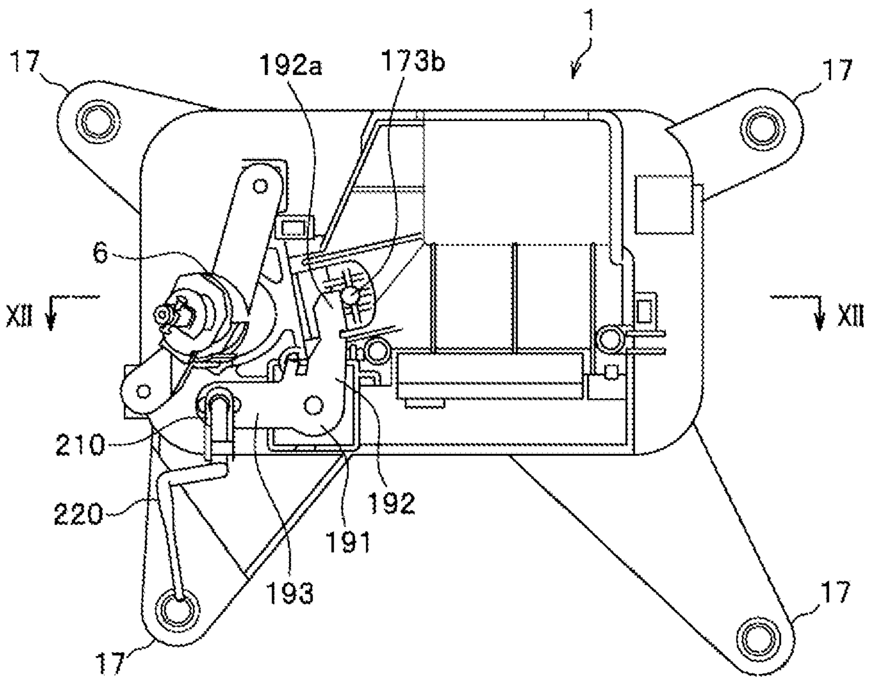
FIG. 11 is a view of the vehicle door handle device according to an embodiment of the present invention as viewed from a position inward in the vehicle width direction, and is a schematic view (enlarged view of a main portion) illustrating a state in which the cover member is closed.
Figure 12:
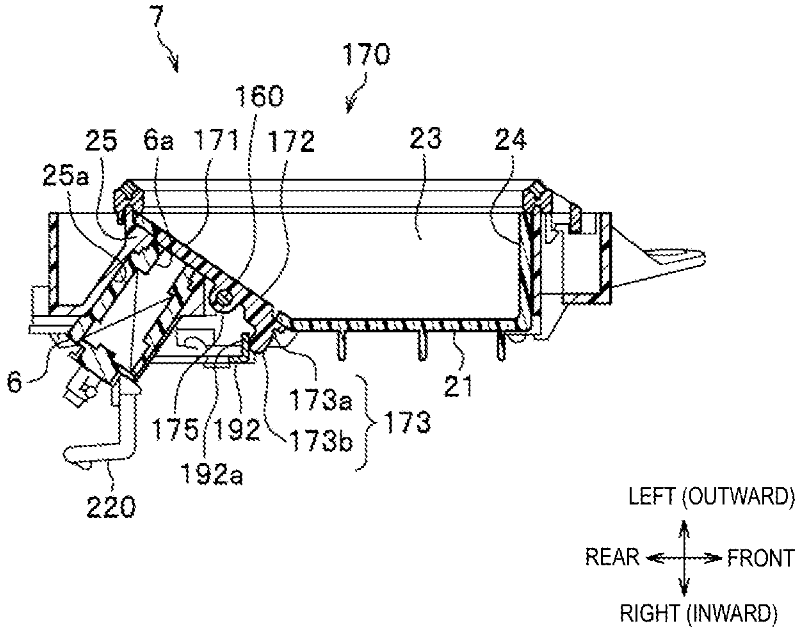
FIG. 12 is a cross-sectional view taken along line XII-XII of FIG. 11.
Figure 13:
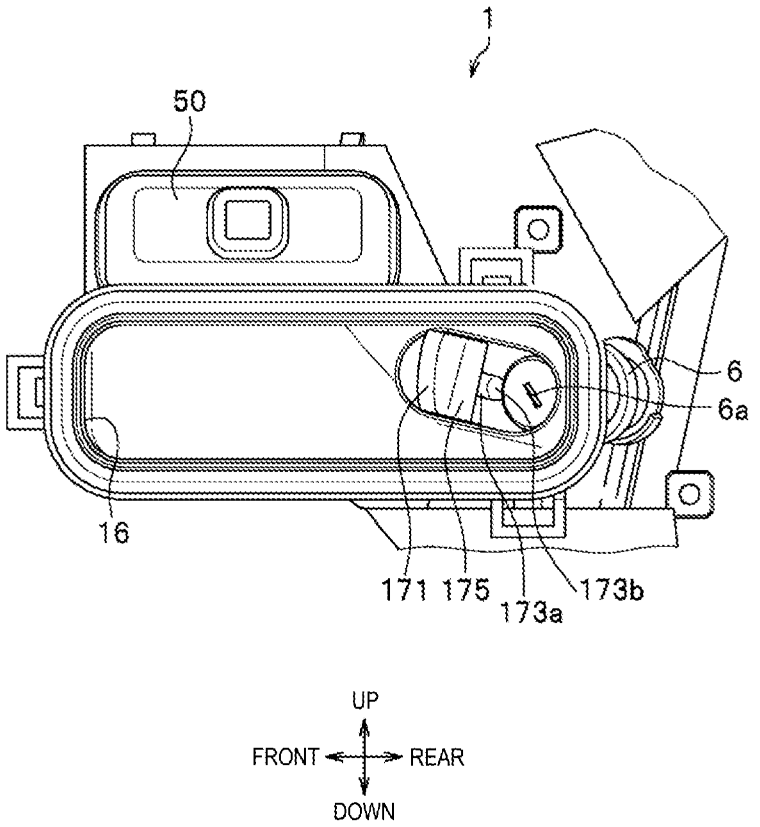
FIG. 13 is a view of the vehicle door handle device according to an embodiment of the present invention as viewed from a position outward in the vehicle width direction, and is a schematic view (enlarged view of the main portion) illustrating a state in which the cover member is open.
Figure 14:
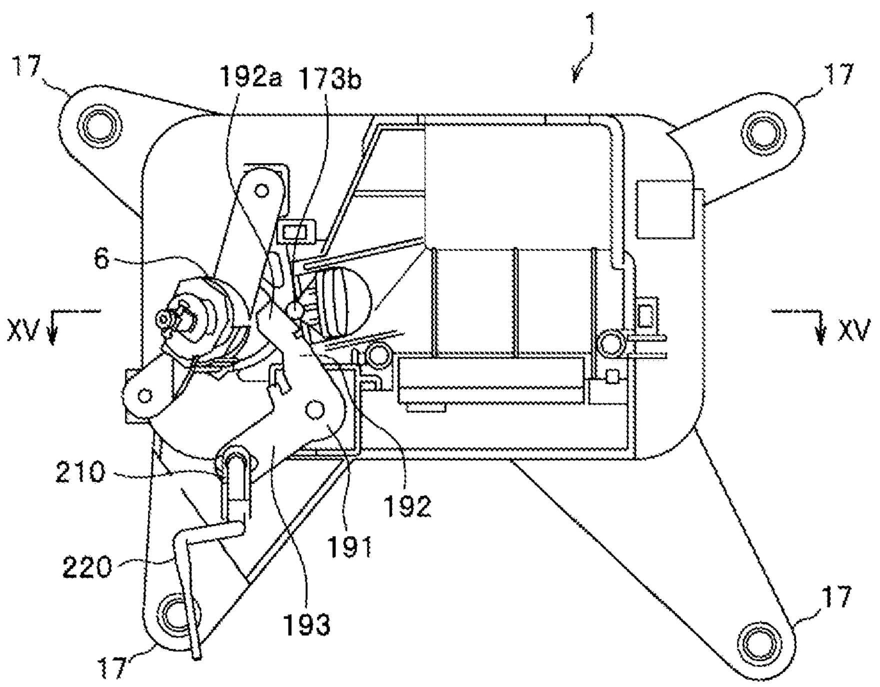
FIG. 14 is a view of the vehicle door handle device according to an embodiment of the present invention as viewed from a position inward in the vehicle width direction, and is a schematic view (enlarged view of the main portion) illustrating a state in which the cover member is open.
Figure 15:
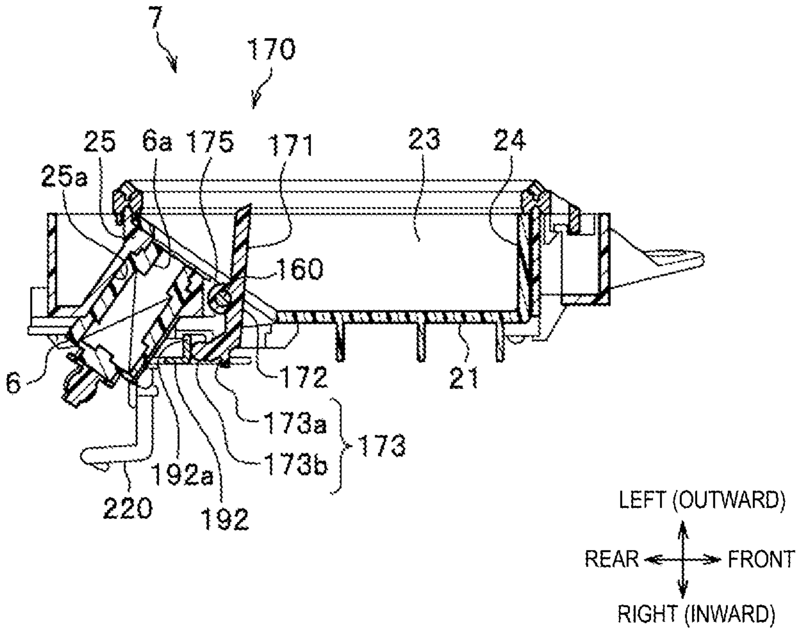
FIG. 15 is a cross-sectional view taken along line XV-XV of FIG. 14.

First, when the user inserts his/her hand into the opening 16 and presses the operation portion 172 of the cover member 170 with his/her finger, the cover member 170 pivots about the pin 160. The cover portion 171 is switched from a covered state (refer to FIGS. 10, 11, and 12) of covering the keyhole 6*a* of the cylinder lock unit 6 to an exposed state (refer to FIGS. 13, 14, and 15) of exposing the keyhole 6*a*.

Here, the actuating portion 173 (engagement portion 173*b*) of the cover member 170 actuates the lever member 190 (rotates the lever member 190 about the shaft 180) by the engagement portion 192*a* of the lever member 190 being pressed while being slid against the biasing force of the biasing member 200. Note that, because the lock unit A23 is in the locked state, the lever unit 8 cannot switch the latch unit A21 from the latched state to the unlatched state.

Subsequently, when the user inserts the key (smart key) into the keyhole 6*a* and operates the cylinder lock unit 6, the cylinder lock unit 6 switches the lock unit A23 from the locked state to the unlocked state.

Subsequently, when the user releases his/her finger from the operation portion 172, the cover member 170 is pressed by the lever member 190 by the biasing force of the biasing member 200 and rotates about the pin 160. The cover portion 171 is switched from an exposed state (refer to FIGS. 13, 14, and 15) of exposing the keyhole 6*a* to a covered state (refer to FIGS. 10, 11, and 12) of covering the keyhole 6*a* of the cylinder lock unit 6.

Here, the flange portion 174 restricts a pivoting range of the cover member 170 by abutting against the inner surface of the peripheral edge portion of the hole 25*a* in the vehicle width direction. Note that, in the present embodiment, areas of the inner peripheral surface of the hole 25*a* and the outer peripheral surface of the cover member 170 that extend in the pivot axis direction away from the pivot axis (pin 160) (areas 25*a*1, 25*a*2 on the inner peripheral surface of the hole 25*a* (refer to FIGS. 5 and 6) and areas 171*a*, 172*a* on the outer peripheral surface of the cover member 170 (refer to FIGS. 8 and 9)) are inclined. This configuration permits rotation of the cover member 170 by the press operation of the operation portion 172 from the state of closing the hole 25*a* and restricts rotation of the cover member 170 in the opposite direction.

Subsequently, when the user inserts his/her hand into the opening 16 and presses the operation portion 172 of the cover member 170 again with his/her finger, the cover member 170 rotates about the pin 160. The cover portion 171 is switched from a covered state (refer to FIGS. 10, 11, and 12) of covering the keyhole 6*a* of the cylinder lock unit 6 to an exposed state (refer to FIGS. 13, 14, and 15) of exposing the keyhole 6*a*.

Here, the actuating portion 173 (engagement portion 173*b*) of the cover member 170 actuates the lever member 190 (rotates the lever member 190 about the shaft 180) by the engagement portion 192*a* of the lever member 190 being pressed while being slid against the biasing force of the biasing member 200. This time, because the lock unit A23 is in the unlocked state, the lever unit 8 switches the latch unit A21 from the latched state to the unlatched state. In such a state, the user can manually open the side door 2 by gripping the peripheral edge portion of the opening 12*a* of the vehicle door handle device 1.

The shape of an area of the actuating portion 173 (specifically, the engagement portion 173*b*) that engages with (abuts against) the engagement portion 192*a* is a curved shape (in the present embodiment, an arc shape) protruding toward the engagement portion 192*a* as viewed from an axial line of the pivot axis of the cover member 170 (in the present embodiment, in a plan view). Note that the shape of the area of the engagement portion 192*a* that engages with (abuts against) the actuating portion 173 (specifically, the engagement portion 173*b*) may be a curved shape (e.g., an arc shape) protruding toward the engagement portion 173*b* as viewed from the axial line of the pivot axis of the lever member 190 (as viewed from a position outward in the vehicle width direction in the present embodiment).

Further, at least one of the engagement (abutment) areas of the engagement portion 173*b* and the engagement portion 192*a* may be configured to have a spherical crown shape protruding toward the other side. Further, at least one of the engagement (abutment) areas of the engagement portion 173*b* and the engagement portion 192*a* may be configured to have a curved shape (e.g., an arc shape) protruding toward the other side in a sliding direction thereof.

According to the structure described above, the engagement portions 173*b*, 192*a* can transfer forces to each other by utilizing the curved shapes of the engagement portions 173*b*, 192*a* while sliding on each other and changing the engagement areas.

The vehicle door handle device 1 according to the embodiment of the present invention includes the handle case 3 including the hole 25*a*, the cylinder lock unit 6 disposed facing the hole 25*a* and configured to switch the door lock device A2 between the locked state and the unlocked state, the cover member 170 pivotably supported by the handle case 3 and configured to switch between the covered state of covering the keyhole 6*a* of the cylinder lock unit 6 and the exposed state of exposing the keyhole 6*a* by pivoting at the hole 25*a*, and the lever member 190 configured to release the latch unit A21 of the door lock device A2. The cover member 170 includes the operation portion 172 configured to rotate the cover member 170 from the covered state to the exposed state and actuate the lever member 190. Accordingly, in the vehicle door handle device 1, since the latch unit A21 can be released by operation of the cover member 170, it is possible to improve operability while suppressing the number of components. Further, the vehicle door handle device 1 can prevent the cover member 170 from falling off or becoming lost.

In the vehicle door handle device 1, the operation portion 172 rotates the cover member 170 from the covered state to the exposed state and actuates the lever member 190 by the press operation of the operation unit 172. Accordingly, in the vehicle door handle device 1, the keyhole 6*a* of the cylinder lock unit 6 can be exposed and the latch unit A21 can be released by operation of the cover member 170 in the same direction, making it possible to further improve operability.

The cover member 170 includes the flange portion 174 overlapping the peripheral edge portion of the hole 25*a* in the covered state. Accordingly, in the vehicle door handle device 1, the gap of the opening 16 is closed by the flange portion 174, making it possible to prevent unauthorized access to the lever member 190 and improve theft resistance.

In the vehicle door handle device 1, the lever member 190 is configured to release the latch unit A21 when the door lock device A2 is in the unlocked state, and is not configured to release the latch unit A21 when the door lock device A2 is in the locked state. Accordingly, when the lever member 190 is actuated in the locked state, the vehicle door handle device 1 can suitably maintain the locked state and a door closed state.

The vehicle door handle device 1 according to the embodiment of the present invention includes the handle case 3 including the hole 25*a*, the cylinder lock unit 6 disposed facing the hole 25*a* and configured to switch the door lock device A2 between the locked state and the unlocked state, the cover member 170 pivotably supported by the handle case 3 and configured to switch between the covered state of covering the keyhole 6*a* of the cylinder lock unit 6 and the exposed state of exposing the keyhole 6*a* by pivoting at the hole 25*a*, the lever member 190 configured to release the latch unit A21 of the door lock device A2, and the biasing member 200 configured to bias the lever member 190 to the initial position. The cover member 170 includes the actuating portion 173 configured to actuate the lever member 190 by rotating from the covered state to the exposed state, and, when the lever member 190 actuated is to be returned to the initial position, the biasing member 200 rotates the cover member 170 from the exposed state to the covered state via the actuating portion 173. Accordingly, in the vehicle door handle device 1, because the cover member 170 is returned to the initial position by the biasing force of the biasing member 200 for the lever member 190, there is no need to provide a biasing member dedicated to the cover member 170, and the number of components can be reduced. Further, the vehicle door handle device 1 can prevent the cover member 170 from falling off or becoming lost.

In the vehicle door handle device, the actuating portion 173 abuts against the lever member 190, and at least one of the abutment area of the actuating portion 173 or the abutment area of the lever member 190 has a curved shape as viewed from the axial line of the pivot axis. Accordingly, the vehicle door handle device 1 optimizes the transmission of the force between the cover member 170 and the lever member 190 and streamlines the operation of the cover member 170 and the lever member 190, making it possible to improve operability.

Although an embodiment of the present invention have been described above, the present invention is not limited to the above-described embodiment and changes can be made as appropriate without departing from the gist of the present invention. For example, the door to which the vehicle door handle device 1 is applied is not limited to a hinge door and may be a sliding door. Further, the door to which the vehicle door handle device 1 is applied may be a type that can be opened and closed manually or may be a type that can be opened and closed automatically. Furthermore, the door to which the vehicle door handle device 1 is applied is not limited to a side door, and may be a back door provided on a rear surface of the vehicle body.

Further, the cover member 170 of the vehicle door handle device 1 may be configured to include an operation portion (protruding portion for pulling or the like) based on a pull operation of the cover portion 171 instead of the operation portion 172 based on a press operation. Furthermore, the cover member 170 of the vehicle door handle device 1 is not limited to emergency use, but can also be used as a normal door latch release handle.

What is claimed is:

1. A vehicle door handle device comprising:

a handle case including a handle recess and a hole, wherein the hole is located within the handle recess;

a cylinder lock unit disposed facing the hole and configured to switch a door lock device between a locked state and an unlocked state;

a cover member pivotably supported by an inner peripheral surface of the hole and configured to switch between a covered state of covering a keyhole of the cylinder lock unit and an exposed state of exposing the keyhole by pivoting at the hole; and a lever member configured to release a latch unit of the door lock device, wherein the cover member includes an operation portion configured to rotate the cover member from the covered state to the exposed state and actuate the lever member, and the cover member is configured to actuate the lever member by a pressing operation of the operation portion until the latch portion is released.

2. The vehicle door handle device according to claim 1, wherein the cover member includes a flange portion overlapping a peripheral edge portion of the hole in the covered state.

3. The vehicle door handle device according to claim 1, wherein the lever member is configured to release the latch unit when the door lock device is in the unlocked state, and is not configured to release the latch unit when the door lock device is in the locked state.

4. The vehicle door handle device according to claim 3, wherein the actuating portion abuts against the lever member, and at least one of an abutment area of the actuating portion or an abutment area of the lever member has a curved shape as viewed from an axial line of a pivot axis.

5. The vehicle door handle device according to claim 1, further comprising:

a biasing member configured to bias the lever member to an initial position, wherein the cover member includes an actuating portion configured to actuate the lever member by rotation of the cover member from the covered state to the exposed state, and wherein when the lever member returns to the initial position after being actuated, the biasing member rotates the cover member from the exposed state to the covered state via the actuating portion.

6. A vehicle door handle device comprising:

a handle case including a handle recess and a hole, wherein the hole is located within the handle recess;

a cylinder lock unit disposed facing the hole and configured to switch a door lock device between a locked state and an unlocked state;

a cover member pivotably supported by an inner peripheral surface of the hole and configured to switch between a covered state of covering a keyhole of the cylinder lock unit and an exposed state of exposing the keyhole by pivoting at the hole;

a lever member configured to release a latch unit of the door lock device; and a biasing member configured to bias the lever member to an initial position, wherein the cover member includes an operation portion for rotating the cover member from the covered state to the exposed state, and an actuating portion configured to actuate the lever member by rotating of the cover member from the covered state to the exposed state, the actuating portion is configured to actuate the lever member by a pressing operation of the operation portion until the latch portion is released, and wherein when the lever member returns to the initial position after being actuated, the biasing member rotates the cover member from the exposed state to the covered state via the actuating portion.

7. The vehicle door handle device according to claim 6, wherein the actuating portion abuts against the lever member, and at least one of an abutment area of the actuating portion or an abutment area of the lever member has a curved shape as viewed from an axial line of a pivot axis.

8. The vehicle door handle device according to claim 6, wherein the lever member is configured to release the latch unit when the door lock device is in the unlocked state, and is not configured to release the latch unit when the door lock device is in the locked state.

* * * * *